9289X
B. Langdon,
Making Laths.
Patented Dec. 15, 1835.
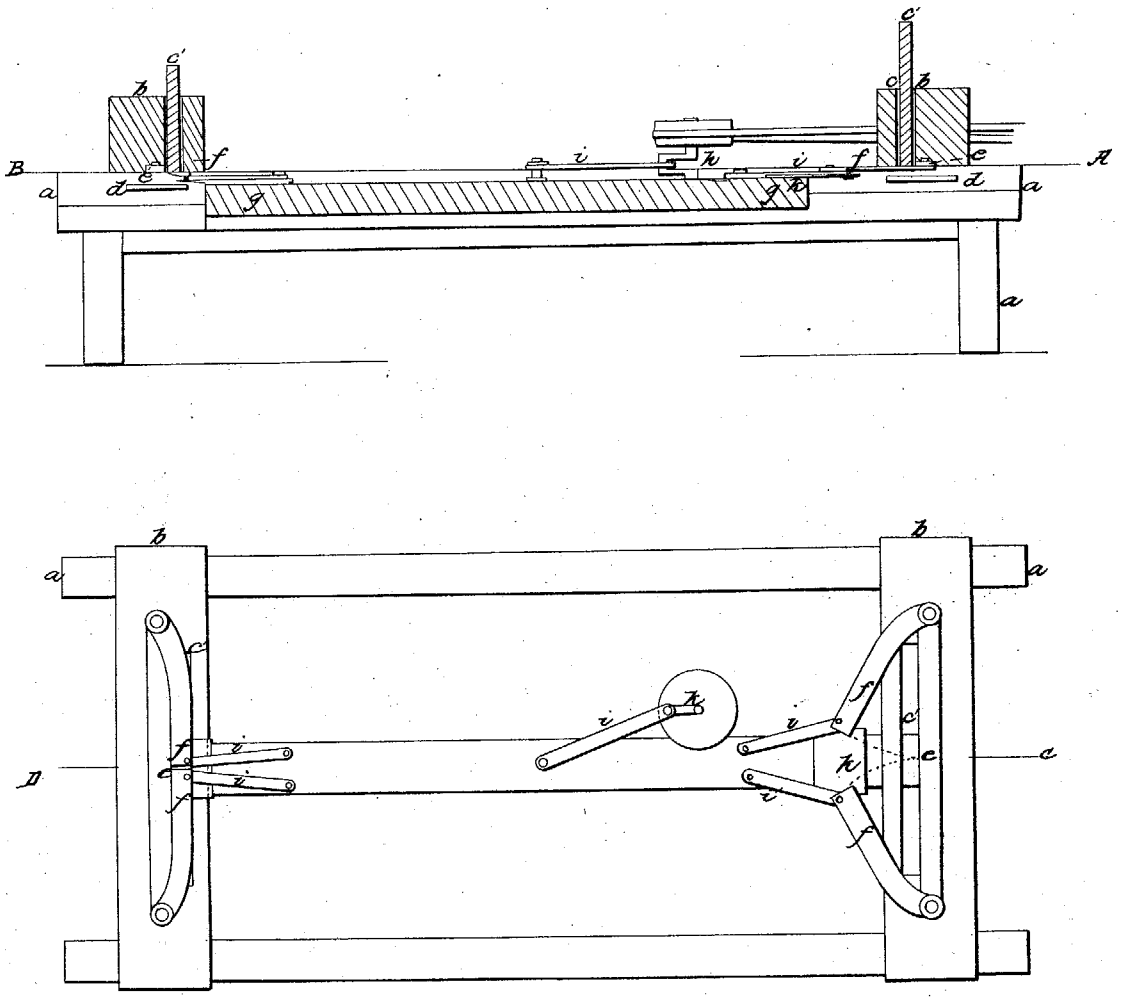
AM. PHOTO-LITHO. CO. N.Y. (OSBORNE'S PROCESS)

1207X Dec. 15. 1835 97.

Barnabas Langdon 758.

The Schedule referred to in these Letters Patent and making part of the same, containing a description in the words of the said Barnabas Langdon himself of his improvement in the Machine for cutting ~~and~~ or splitting Laths

---

To all to Whom these presents shall come.

Be it known that I Barnabas Langdon of the City of Troy in the County of Rensselaer and State of New York, have invented a new and useful improvement in Machinery for Cutting or Splitting Lath — and that the following is a full and exact description thereof —

A rectangular frame is to be provided, about sixteen feet long and seven feet wide, more or less. The height of the frame is to be such & the several parts of it with its fixtures and appendages, of such dimensions and materials, and so disposed, as in judgment shall be adapted to the operating part of the Machinery & to the process as well as to the convenience of attending to and conducting the same. The Lath, upon the principle of the improvement, are to be cut or separated from the under edge of a board or plank to be prepared and placed in the machine for the purpose, by means of knives or cutting tools, hereafter to be described. In order to effect this there should be a cross beam or head block upon the upper part of each end of the frame, with a slot or opening through it from the upper to the lower surface vertically — and in length to an extent a little more than equal to the length of the lath which is to be cut by the machine. This slot, being for the purpose of having the boards placed within it should be near the inside of the cross beam & of such width as to allow the board to drop by its own weight or be easily pressed Drawing made pressed down upon guages provided underneath for the lower edge of the board to rest upon as the lath are successively cut or separated from it. Two knives or cutting tools are to be employed in separating each lath from the board. One end of each knife is to be secured to the plate (hereafter to be described) attached to the under side of the head block near the side of the frame, by a screw or pin or other flexible joint, so as to allow the other or inner end to move horizontally one way or the other upon this joint as the centre of its sweep. The edge of the knives are to be placed outward & and their action in separating the lath from the board, is, by drawing back their inner end from the head block far enough to allow the board to drop down in the slot before the edge of the knives upon the guage or rests provided for it, & then having their inner ends forced back til the entire length of edge of each knife passes under or a little beyond the slot, In this way the lath is separated from the board, and when the knives are again drawn back the board will also again drop drawn to its guage ready for the production of another lath. A steel plate is to be attached to the under side of the head block out side of the slot the inner edge of which, or the lower angle of it being made smooth & of rectangular form is to constitute the lower edge of the slot, on that side against which the knives are to act, they being made to pass under and in contact with it, thereby causing the plate to perform in effect the counter part of the cutting process which separates the lath from the board. In order to give the edge of each knife a drawing motion as it cuts off the lath, the blade shd be so formed by inclining or curving its outer end forward of the line of its edge as to have the screw or pin which secures that end to the steel plate under the head block pass

9289X pass through it for that purpose & thus fix the flexible joint at a discretionary distance forward of such line accordingly. The length of the knives is to be such as to bring the inner ends nearly in contact with each other, as they pass in together under the head block. In order to give them the motion required for cutting or separating the latter, a sliding bar or beam is to be provided and placed horrizontally in the centre of the frame, upon fix tures prepared for it. As there may be a cutting apparatus of the foregoing description, at each end of the frame, & it being the object of the present improvement to have it so, this slide should extend in length nearly to each pair of knives, so as to give effect to both. This is to be done by giving a reverberating movement to the slide in the direction of its length by means of a crank which shall be made to revolve near it for that purpose & connecting them together by a shackle bar or sweep, the same being attached to the slide by a pin or other flexible joint, adapted to such operation - and the same motion is to be communicated to the inner ends of the knives by connecting each to one end of a shackle bar, while the other end of the same bar is to be attached to the upper surface of the slide, both by pin or other flexible joints. The sweep to be given to the crank and the length of the shackle bar & also of those connecting the slide with the knives being sufficiently indicated by the purposes to be answered by each, they are here left without further description as matters of judgment to be exercized in their construction. So also of the moving power of the machinery and of its application thereto It may be by gear bands or otherwise at discretion. In order to adjust the edges of the knives to the plate under the head block, a plate of metal may be attached to the upper surface of each end of the slide through which an adjusting screw may be extended up so as to bear against the under side of the blade or plate of of each knife, the inner end of which in its connection
with the shackle bar being brought on to the end of the slide suf-
ficient for that purpose. In this way the knife may be raised or
depressed as occasion shall require. So also the guages on
which the board rests, as it drops down in the slot before the
knives, being made elastic, may in like manner be elevated
or depressed by means of a screw passing through a fixture of the
frame against the under side of each guage, and the thick-
ness of the lath thereby regulated. As an alternative
improvement, instead of two knives at each end of the frame,
as above described, for cutting or separating each lath, one knife
or cutting tool only may be used. In which case, its outer
end being like the other attached to the plate of the head block
near the side of the frame & the length of the knife being equal to
the length of the lath to be cut by it, the other end is to be oper-
ated in the same manner, or upon the same principles. One
of such single knives being fixed at each end of the frame,
& like the double knives connected with the slide, it is ob-
vious that in either case a lath will be produced at each
reverberating movement thereof, one at each end alternate-
ly. The knives or cutting tools, except about four inches
wide of the blade or edges, may be of cast iron, suitably pre-
pared, and the blade attached thereto by screws or otherwise.
For a further illustration of my invention, I refer to the
model & drawing of the same deposited in the patent Office.
What I claim as my own invention, and not previously
known in the above described machine, is the machine it-
self and the manner of cutting lath as above specified and de-
scribed (Witnesses
Daniel Whiting
Wm Wright Jr B. Langdon (1524 words)

R. H. B.
6 Ja. 1837 not sufficiently definite to be drawn